United States Patent [19]

Seely

[11] 3,730,067
[45] May 1, 1973

[54] RANGEFINDER MECHANISM
[75] Inventor: Neil G. Seely, Brockport, N.Y.
[73] Assignee: Eastman Kodak Company, Rochester, N.Y.
[22] Filed: Aug. 2, 1971
[21] Appl. No.: 168,222

[52] U.S. Cl. .............................................. 95/44 C
[51] Int. Cl. ........................................... G03b 17/12
[58] Field of Search ..................................... 95/44 C

[56] References Cited

UNITED STATES PATENTS

| | | |
|---|---|---|
| 3,150,579 | 9/1964 | Lange .................................. 95/44 C |
| 3,257,924 | 6/1966 | Papke .................................. 95/44 C |
| 3,027,820 | 4/1962 | Crabtree .............................. 95/44 C |

Primary Examiner—Samuel S. Matthews
Assistant Examiner—Michael D. Harris
Attorney—William H. J. Kline et al.

[57] ABSTRACT

A rangefinder of the type adapted to provide two superimposed images one of which is adjustable with respect to the other by focusing a lens system of a camera, for example, includes means for adjusting the rangefinder to correctly locate elements of the rangefinder so that two images of a scene are superimposed when the lens is focused on the scene. These adjustments include adjustment of a mirror about each of two axes substantially perpendicular to each other, and adjustment of a coupling between the lens system and the rangefinder mechanism so that the rate of adjustment of the rangefinder during focusing of the lens is coordinated with movement of the lens during such focusing of the lens system.

3 Claims, 7 Drawing Figures

Patented May 1, 1973

NEIL G. SEELY
INVENTOR.

BY G. Herman Childress

W. H. J. Kline

ATTORNEYS

NEIL G. SEELY
INVENTOR.

BY *G. Herman Childress*
*H. H. J. Kline*
ATTORNEYS

RANGEFINDER MECHANISM

BACKGROUND OF THE INVENTION

1. Field of the Invention

This invention relates to rangefinder mechanisms and more particularly to a rangefinder mechanism wherein two images of a scene are provided and are superimposed so that when they are in alignment with each other and associated lens system of a camera or the like is in focus for photographing the scene.

2. Description of the Prior Art

Rangefinders utilizing superimposed images of a scene are well known in the art. These rangefinders may be used in cameras having an adjustable-focus lens system. Such rangefinders should include suitable means for effecting factory adjustment of elements of the rangefinder to properly orient the two superimposed images relative to each other for any particular adjustment of the camera lens system, and to provide for control of the rate at which the rangefinder is adjusted in response to adjustment of the lens system in the camera. Rangefinders of the superimposed-image type may comprise a beam splitter through which a first image is directed from a scene to be photographed to a plane, and a mirror which reflects an image of the same scene onto a surface of the beam splitter and then to such plane. Typically the mirror is adjusted to accurately locate it with respect to the beam splitter so that the image reflected by the mirror is properly aligned about each of two axes. Some such prior art mechanisms for effecting these adjustments are complicated structurally, are not easy and economical to manufacture or adjust, or do not provide the accuracy required in modern cameras.

SUMMARY OF THE INVENTION

Accordingly it is an object of the invention to provide an improved rangefinder of the type using superimposed images wherein the rangefinder is relatively simple to construct and/or assemble and to adjust, and wherein the rangefinder is accurate in its operation thereby insuring sharply focused images in an associated camera.

Another object of the invention is to provide improved mechanisms for accurately and reliably effecting each of three adjustments of a rangefinder of a camera so that the mechanism can be used to accurately focus an associated camera lens on a scene to be photographed.

In accordance with the invention an adjustable rangefinder is provided for a camera or the like having a lens system for directing rays from a scene along an optical axis to an exposure plane in the camera, and the lens system is adjustable by movement of the lens element so that scenes at various distances from the camera can be focused in the exposure plane. The rangefinder comprises a beam splitter and a mirror for furnishing two different images to a viewfinder in the cameras. The mirror is adjustable in response to focusing of the camera lens system so that the two images in the viewfinder are in alignment when the lens system has been focused on the scene. The rangefinder includes means for adjusting the mirror about each of two non-parallel axes so that the images of a particular scene can be brought into coincidence when the lens system is focused on the scene. As the lens is refocused onto another scene the mirror is automatically adjusted so that the images of the new scene coincide in the plane. This is assured by means for adjusting the rate at which the mirror is moved in response to refocusing of the lens.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

Because photographic cameras are well known, the present description will be directed in particular to elements forming part of, or cooperating more directly with, the present invention, camera elements not specifically shown or described herein being understood to be selectable from those known in the art.

Figure 1:
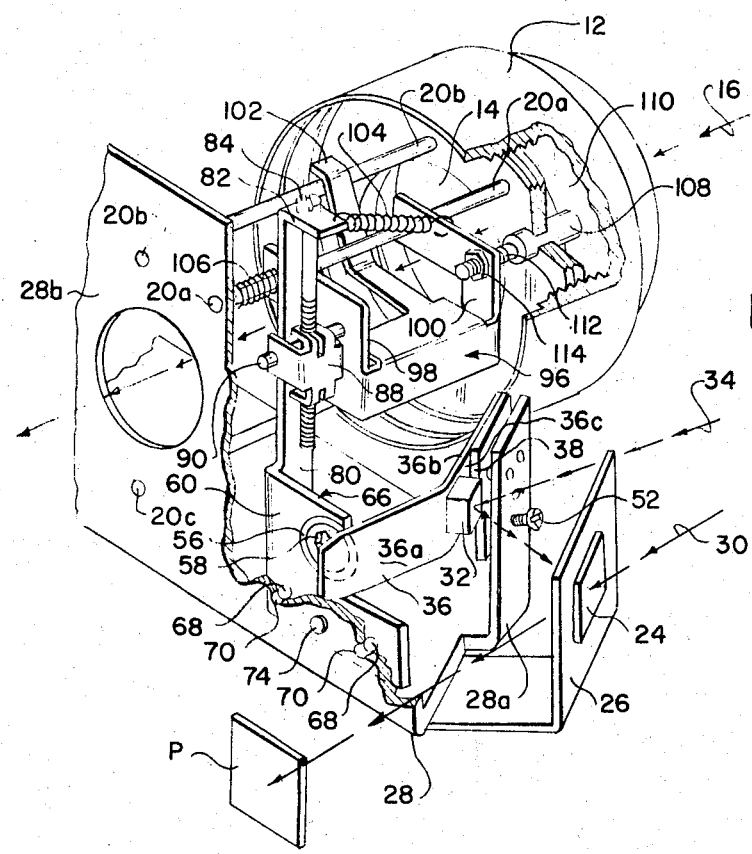
FIG. 1 is a perspective view of a preferred embodiment of a rangefinder mechanism of the invention, and showing a portion of a camera in which the mechanism is incorporated.

Referring to FIG. 1, the rangefinder of the invention is particularly adapted for use with a camera (such as a motion picture camera) having a generally cylindrical lens mount 12 which receives and holds an objective lens element 14. Lens element 14 may be only one of a plurality of lens elements defining a lens system which directs light rays from a scene to be photographed along an optical axis 16 to an exposure plane (not shown) in a camera where film is exposed to the light rays. The lens mount is threaded on its inner surface, and the threads engage threads on a fixed lens support member 18. Thus lens element 14 is adjustable along the optical axis by rotation of lens mount 12, thereby to focus a scene to be photographed at any distance throughout a range of distances from a camera. The lens support member 18 is supported on a plurality of positioning rods, three of which are shown in the drawings at 20a, 20b and 20c. The rangefinder of the invention provides two superimposed images of a scene in a plane P where they are visible to the camera operator through the viewfinder of the camera and appear to be a single image when the lens system of the camera has been adjusted to focus an image of the same scene at the exposure plane of the camera. Thus, the camera operator, by viewing the images visible through the viewfinder can determine when or if the lens system is focused on the scene the operator desires to photograph.

The rangefinder of the invention comprises a beam splitter 24 carried by a suitable holder 26 that is rigidly mounted on a mechanism plate 28 of the camera. The beam splitter is located along and disposed at an angle of approximately 45° to a path or axis 30 between the scene to be photographed and the plane P. Thus one image of the scene to be photographed is provided directly through the beam splitter along path 30. A second image of the scene to be photographed is provided by a mirror 32 which is disposed with respect to the scene to be photographed and to the beam splitter 24 so that light rays from the scene will travel along a second path 34 to the mirror and be reflected by the mirror to the back surface of beam splitter and then reflected by the beam splitter to the plane P. As is conventional in coincidence type rangefinders, the two images furnished to plane P along paths 30 and 34 should coincide with each other and appear to be a single image when the lens is focused on the scene to be photographed and when the rangefinder mechanism is properly adjusted. In order for the rangefinder to be properly adjusted it is necessary that the mirror 32 be positioned accurately with respect to beam splitter 24, thereby requiring accurate adjustments to be made for locating the mirror (or the beam splitter) about each of two axes substantially perpendicular to each other, and the position of the mirror (or the beam splitter) must be continuously adjusted in response to focusing of the lens system. The means for effecting these adjustments will now be described.

Figure 2:
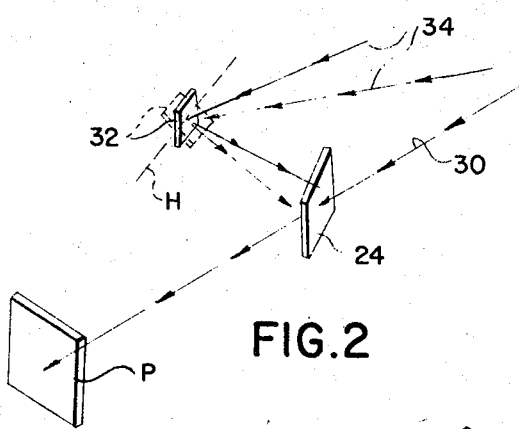
FIGS. 2 and 3 are diagrammatic views illustrating adjustments of a mirror of the mechanism relative to a beam splitter.

Mirror 32 is secured to a relatively thin, plate 36 having end portions 36a and 36b which are disposed with respect to each other to define an obtuse angle. The mirror 32 is located on end portion 36b which, in turn, is mounted on a bracket 38 supported by a fixed flange 28a of the plate 28. Bracket 38 and plate 36 are adjustable with respect to flange 28a by the adjustment means best shown in FIG. 4. Such adjustment means comprises a pair of spaced balls 42 which are seated in two aligned pairs of holes 44 and 46 in the bracket and flange, respectively. The balls are in the same plane as the mirror. A rivet 48 is connected to the flange and extends loosely through bracket 38. A head portion of the rivet is adjacent but spaced from the surface of the bracket opposite from the flange. A spring 50 coiled about the shank of the rivet reacts from the head of the rivet against bracket 38 to urge the bracket to pivot about an axis H (FIG. 2) defined by the center of balls 42 in a direction tending to bring the portion of the bracket below the balls into engagement with the flange. The balls are located relative to the mirror so the axis H extends through the mirror midway between the top and bottom of the mirror. Movement in the opposite direction and thus the actual adjustment of the bracket 38 and mirror 32 is controlled by an adjusting screw 52 which is threaded through the flange 28a and bears against the bracket 38 below the balls so that rotation of the adjusting screw in one direction moves the bracket against the biasing force of the spring 50. As shown in FIG 2, the adjustment tilts the mirror about axis H (referred to herein as a horizontal axis) defined by a line through the centers of balls 42 and the mirror so that light rays to the mirror along different light paths 34 can be reflected to beam splitter 24 and then to plane P.

Figure 3:
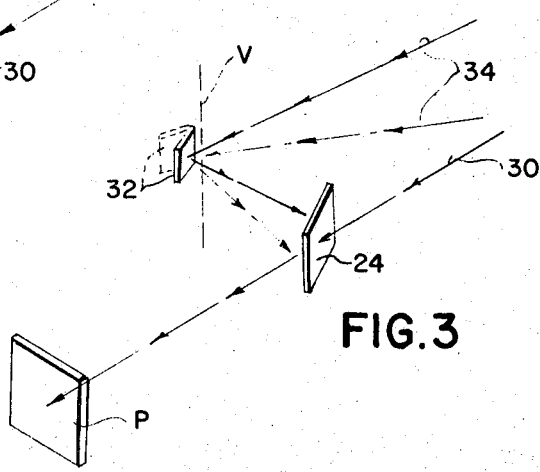
Figure 5:
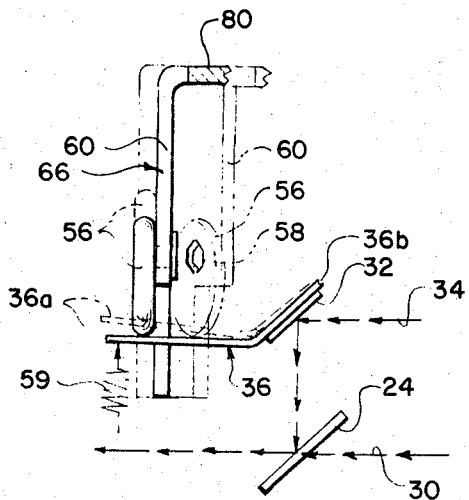
FIG. 5 is a view of portions of the rangefinder mechanism used for adjusting the mirror about a second axis.

Referring now to FIGS. 1, 3 and 5, means are provided for adjusting mirror 32 about a second (vertical) axis V (FIG. 3) perpendicular to the axis H. This adjusting means comprises a hinge on plate 36, the hinge being located along a line 36c on the side of the bracket 38 adjacent plate 36 and the edge of the bracket which is nearest to the mirror. This hinge line may be formed by various means, such as scoring the plate along line 36c or by providing slots or perforations along line 36c. As will be apparent to those skilled in the art, an actual hinge could be provided along the line 36c.

Movement of the plate 36 about line 36c (i.e. axis V) for adjusting the location of the mirror is controlled by an eccentric 56 mounted by a pin 58 onto a bracket 60. he eccentric has an edge in engagement with plate portion 36a and this engagement is maintained by spring means diagrammatically shown at 59 in FIG. 5. Thus rotation of the eccentric about the axis of pin 58 effects adjustment of the plate 36 about line 36c in either of two directions. FIGS. 3 and 5 show two possible positions of movement of the mirror 32 about axis V in response to adjustment of the eccentric member. The adjustment of the position of the mirror 32 by the structure shown in FIG. 5 may be referred to as the infinity adjustment since it varies the angle defined by the path 34 of light rays traveling to the mirror relative to the path 30 for such rays from the scene directly to the beam splitter 24. The two adjustments for mirror 32 described hereinbefore are normally made in the factory and typically do not require readjustment by the camera operator.

It is necessary to coordinate the position of mirror 32 about axis V and the position of the lens element 14 so that when the lens system is focused on a scene the mirror will furnish an image of the same scene to plane P. The member 60 on which the eccentric 56 is mounted comprises part of an assembly generally designated 66 that adjusts the position of mirror 32 as a function of the focusing of the lens system. In operation, assembly 66 moves the eccentric about an axis through the lower portion of member 60. As explained later, this assembly is adjustable to vary the rate at which the mirror is moved in response to the focusing of the lens system so that the rangefinder accurately coordinates movement of the mirror 32 with adjustment of the lens throughout the range of adjustment of the lens.

Figure 6:
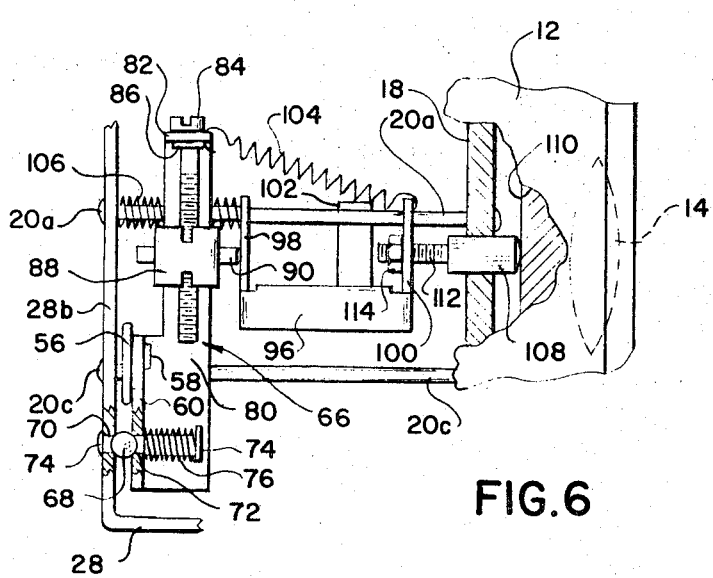
FIGS. 6 and 7 are views illustrating portions of the mechanism used for adjusting the rate at which the rangefinder is moved in response to focusing of the camera lens system.

Referring now to FIG. 1 and 6, member 60 is pivoted to a flange portion 28b of the mechanism plate 28 by means of a pair of spaced, spherical balls 68 located between the flange portion 28b and member 60. The balls are held in their assembled position by being partially received into aligned apertures 70 and 72 in flange 28b and member 60, respectively. The member 60 is urged toward the flange portion 28b by a rivet 74 which is secured to flange portion 28b and projects loosely through an opening (not shown) in member 60. A spring 76 coiled about the rivet reacts from the head of the rivet against member 60 for urging the member toward flange 28b. The rivet is located along a pivot axis defined by balls 68 so that the spring force tends to seat the balls but does not tend to pivot member 60.

A support 80 is integrally formed with member 60 and disposed at substantially a right angle thereto. On the end portion of the support opposite from member 60 there is a flange or tab 82 which mounts an adjusting screw 84. Screw 84 is connected to tab 82 so that it is rotatable with respect to the tab but does not move relative to the tab in a direction parallel to the axes of the screw. This can be accomplished by means by a retainer 86 which engages the shaft of the screw immediately below tab 82.

Figure 7:
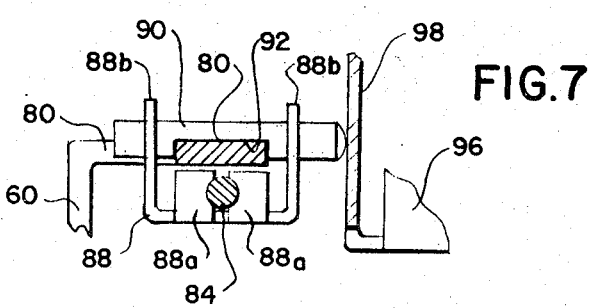

Referring to FIGS. 1, 6 and 7, a screw follower 88 has flange portions 88a which engage the threaded portion of the screw 84 for travel along the screw threads. Follower 88 has two spaced flange portions 88b which straddle the screw 84 and which serve to mount a pin 90. The pin has an elongate slot 92 (FIG. 7) which snugly receives the portion of the support member 80 facing away from screw 84. When screw 84 is rotated, the follower 88 is adjusted upwardly or downwardly along the screw threads, thereby moving the pin 90 upwardly or downwardly toward or away from the pivotal axis defined by balls 68. As explained more fully hereinafter, this movement controls the rate at which mirror 32 is adjusted in response to focusing of the lens 14 and, typically, is a factory adjustment. During movement of the follower 88 it is prevented from tilting due to the interlocking engagement between the pin and the support 80 and by the provision of the mounting flanges 88a which are located in spaced relation along the axis of the adjusting screw.

FIGS. 1 and 6 also show a slider 96 having spaced flange portions 98 and 100 through which rod 20a extends so that the slider is movable along the rod in a direction substantially parallel to the optical axis 16. A third flange 102 on the slider is positioned beneath the rod 20a and extends up and over the adjacent rod 20b to limit pivotal movement of the slider assembly about rod 20a. Flange 98 of the slider is engageable by the pin 90 on follower 88 and the slider is urged toward the follower by a tension spring 104 stretched between the flange 100 and tab 82. Spring 104 is relatively weak spring, and the slider assembly is urged toward the right away from the follower 88 by a somewhat stronger compression spring 106 which is coiled about the rod 20a and bears against the flange portion 28b of the mechanism plate and the flange 98.

The slider assembly is moved to the left against the biasing force of spring 106 in response to adjustment of the movable lens element during focusing of the lens. This is accomplished by means of a follower pin 108 which slides axially through the support member 18 and bears against a ring 110 carried by the lens mount 12. Follower pin 108 is coupled to the slider assembly by means of a threaded shaft 112 carried by the follower pin and a nut 114 fixed to flange 100 of the slider assembly and through which the shaft 112 is threaded. It will be apparent that this threaded connection between the follower pin 108 and the flange 100 of the slider permits adjustment of the sliding connection between the adjustable lens element and the slider assembly. As explained later, this adjustment is part of the means for controlling the rate at which the mirror 32 is moved in response to focusing of the lens 14. When the adjustable lens element is moved during focusing of the lens, the follower pin 108 is moved in a direction parallel to the optical axis 16 either toward or away form the lens, depending upon the direction of movement of the lens during focusing. This movement of the follower is transmitted through shaft 112 and slider 96 to the pin 90 on the follower 88, thereby swinging the support 80 and the member 60 about the pivotal axis defined by the balls 68 at the bottom portion of member 60. This, in turn, moves the eccentric 56 relative to plate 36 as shown in phantom and solid lines in FIG. 5, thereby moving the plate 36 and the mirror 32 carried by it about axis V. Thus movement of the lens system changes the image furnished to plane P along path 34 by the mirror 32.

Figure 4:
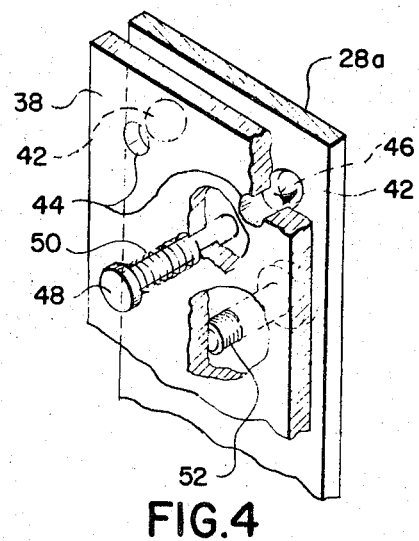
FIG. 4 is a fragmentary view illustrating a portion of the rangefinder mechanism used for adjusting the mirror with respect to a first axes.

Operation of the rangefinder of the invention will now be described. When the rangefinder is assembled, mirror 32 must be adjusted relative to the lens so that when the lens is focused on a scene to be photographed to provide a focused image in the exposure plane of the camera, the two images of the same scene formed at plane P of the viewfinder will coincide with each other. This is accomplished by adjusting the position of the mirror with respect to first and second axes (H and V) which may be referred to as a horizontal axis and a vertical axis. Adjustment of the position of the mirror about the first axes or the horizontal axes is illustrated in FIG 4, and comprises adjustment of the screw 52 to effect movement of plate 38 relative to the mechanism plate 28, thereby tilting the mirror in an upwardly or downwardly direction relative to a horizontal axis H. This adjustment is illustrated in FIG. 2 of the drawing which shows two different paths 34 for light rays for two scenes, the various paths being located in a vertical plane perpendicular to the horizontal axis H. By this adjustment the top and bottom of the image of the scene furnished to the viewfinder along the path 34 is adjusted to coincide with the top and bottom of the image of the scene viewed through the viewfinder and furnished to plane P along path 30.

A second adjustment of the mirror 32, which may be referred to as the infinity adjustment, is effected by movement of the mirror about the second or vertical axis V. The second axis is substantially perpendicular to the first axis. This adjustment is effected by rotation of the eccentric 56 about its mounting thereby to cause plate 36 to swing about the hinge line 36c. This adjustment is illustrated in FIG. 3 of the drawings which illustrates two different positions for the path 34 effected as a result of adjustment of mirror 32 about the vertical axis. These positions of path 34 lie along a plane which is substantially horizontal and perpendicular to the axis about which the mirror is being adjusted. This adjustment varies the angle defined by the light rays from a point of the scene to be photographed to the mirror and by the line along which such rays are reflected by the mirror to the beam splitter 24.

The rate at which the mirror is moved by the eccentric during movement of the lens is adjusted so that the two images of scenes furnished to plane P coincide for each position of the lens assembly throughout its entire range of focusing adjustment. This is accomplished by controlling the pivotal movement of member 60 and thus eccentric 56 in response to the adjustment of the lens through its range of movement. The extent of pivotal movement of member 60 is controlled by the position of pin 90 as determined by the location of follower 88 on screw 84. Rotation of the screw causes the follower 88 to move upwardly or downwardly along the axis of the screw, thereby changing the point at which the pin 90 contacts the flange 98 of the slider 96. As will be evident from the drawings, this adjustment of the relative positions between the pin and the slider will change the angular extent to which the member 60 and thus eccentric 56 are moved in response to the travel of the slider 96. In other words, an upward adjustment of the follower 88 will produce a relatively small angular movement of the eccentric whereas a downward adjustment of the follower effects a somewhat larger angular movement of the eccentric.

The stroke of the eccentric also can be adjusted by rotating the shaft 112 on follower pin 108 to vary its position relative to the flange 100 of the slider, thereby determining the initial and final angular position of the member 60, and thus determining the initial and final point at which the eccentric 56 contacts the plate 36.

Once the adjustments referred to above have been made, the camera operator focuses an image of a scene to be photographed at the exposure plane of the camera simply by adjusting lens 14 while viewing through the viewfinder images provided to the plane P of the camera. The adjustable lens element is moved until the image of the scene transmitted along path 30 and the image transmitted along path 34 coincide with each other in plane P. As will be apparent from the foregoing description, movement of the adjustable lens along axis 16 effects movement of the mirror 32 due to pin 108 moving the slider assembly 96 which in turn acts through flange 98 of such assembly and the pin 90 of follower 88 to pivot the support 80, member 60 and eccentric 56 about the axis defined by the balls 68 located between the bottom portion of the member 60 and the flange 28b of the mechanism plate. This movement of the eccentric causes it to travel along the surface of plate portion 36a, thereby hinging the mirror about line 36c to vary the position of the mirror about vertical axis V.

The rangefinder of the invention is relatively simple structurally however, it permits very accurate adjustment of the various element, such being necessary to insure a high degree of accuracy in the focusing of the lens system by a camera operator.

The invention has been described in detail with particular reference to preferred embodiments thereof, but it will be understood that variations and modifications can be effected within the spirit and scope of the invention.

I claim:

1. In an adjustable rangefinder for a camera having a lens system for directing light rays from a scene along an optical axis to an exposure aperture in the camera, the lens system having a lens element movable along the optical axis for adjusting the focus of the lens system to form a focused image at the aperture, the rangefinder having: (1) a beam splitter positioned to receive and transmit rays from a scene through the beam splitter along a first path to provide a first image of the scene, (2) a mirror positioned with respect to the beam splitter to deflect rays received from the scene along a second path to the beam splitter to provide a second image of the scene, (3) first adjusting means coupled to said mirror for adjusting said mirror about a first axis, and (4) second adjusting means coupled to said mirror for adjusting said mirror about a second axis substantially perpendicular to the first axis, said first and second adjusting means permitting the mirror to be located with respect to said beam splitter so that the first and second images can coincide with each other, the improvement comprising:

means coupled to said mirror and adapted to be coupled to the lens system for moving the mirror about one of said axes at a predetermined rate in response to movement of said movable lens element, thereby to change the second image of the scene as a function of the adjustment of said lens element, said means for moving the mirror including means for adjusting the predetermined rate of movement of the mirror effected by a predetermined movement of said lens element whereby the first and second images of a scene provided by the rangefinder will coincide when the lens system is focused on the scene, a member mounted for pivotal movement about an axis substantially perpendicular to the optical axis, means supported by said member and coupled to the mirror for moving the mirror in response to pivoting of the member, a slider, means mounting said slider for movement in a direction substantially parallel to the optical axis, means coupling said slider to the movable lens element so that the slider is moved in response to focusing of the lens system, and means coupling said slider to said member to effect movement of said member in response to focusing of the lens system.

2. An adjustable rangefinder as set forth in claim 1, wherein the means coupling the slider to the member comprises a follower mounted for pivotal movement with said member, said follower being engageable with said slider to translate movement of the slider into pivotal movement of the member, and means for adjusting the follower toward and away from the pivotal axis of the member, thereby to control the extent of the pivotal movement of the member in response to a predetermined movement of the slider.

3. An adjustable rangefinder as set forth in claim 1 wherein the means coupling the slider to the movable lens element comprises a follower pin, and means adjustably connecting the pin to the slider to control the position of the member relative to its pivotal axis for each position of the movable lens element.

* * * * *